(12) United States Patent
Larson

(10) Patent No.: US 9,845,196 B2
(45) Date of Patent: Dec. 19, 2017

(54) LOAD REACTIVE BRAKING SYSTEMS AND DEVICES

(71) Applicant: GOODRICH CORPORATION, Charlotte, NC (US)

(72) Inventor: Wally H. Larson, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 7 days.

(21) Appl. No.: 15/154,556

(22) Filed: May 13, 2016

(65) Prior Publication Data

US 2017/0327315 A1  Nov. 16, 2017

(51) Int. Cl.
*B65G 39/00* (2006.01)
*B65G 13/075* (2006.01)
*F16D 51/00* (2006.01)

(52) U.S. Cl.
CPC ........ *B65G 13/075* (2013.01); *B65G 2205/02* (2013.01); *F16D 51/00* (2013.01)

(58) Field of Classification Search
CPC . B65G 39/00; B65G 13/075; B64D 2009/006
USPC ............. 193/35 A, 788; 198/788; 244/118.1; 188/134
See application file for complete search history.

(56) References Cited

U.S. PATENT DOCUMENTS 3,285,377 A * 11/1966 Rasmussen ............. F16D 59/00
                                                        188/134
3,713,521 A *  1/1973 Moritake ............... B65G 23/08
                                                        188/161
8,109,702 B2 *  2/2012 Stegmiller ............... B64D 9/00
                                                        193/35 B

* cited by examiner

*Primary Examiner* — Gene Crawford
*Assistant Examiner* — Lester Rushin
(74) *Attorney, Agent, or Firm* — Snell & Wilmer L.L.P.

(57) ABSTRACT

A roller assembly comprises a housing having an outer surface attached thereto, and a braking arrangement positioned at least partially within the housing. The braking arrangement is configured to increase resistance to rotation of the housing proportionally to a load applied against the outer surface.

20 Claims, 5 Drawing Sheets

LOAD REACTIVE BRAKING SYSTEMS AND DEVICES

FIELD

The disclosure relates generally to reactive load braking, and more particularly, to systems and devices for load reactive braking in cargo movement.

BACKGROUND

Rollers, coasters, and other wheeled mechanisms are often used to move loads. For heavy loads, the rollers may have an associated braking mechanism to prevent loss of control. In cargo loading systems, for example, braking rollers may have the braking arrangement preset at or near the maximum braking load that is selected for a maximum weight cargo container at the maximum angle of the cargo floor. In most cases, the strong brakes on the rollers are too powerful to allow the roller to roll under light loads. Braking rollers often have a friction material around the outer surface. In instances where the load applied to the roller is not enough to overcome the braking mechanism, the container skids over the roller and creates flat spots on the roller.

SUMMARY

According to various embodiments, a roller assembly is provided. The roller assembly comprises a housing having an outer surface attached thereto, and a braking arrangement positioned at least partially within the housing. The braking arrangement is configured to increase resistance to rotation of the housing proportionally to a load applied against the outer surface.

In various embodiments, the roller assembly may include a linkage coupled to the axle and a roller support structure pivotally coupled to the linkage. The linkage may be configured to pivot relative to the axle and the roller support structure in response to the load on the outer surface. The roller assembly may also include an axle interface disposed at a distal end of axle and a roller support structure having an angled surface. The axle interface may be configured to engage the angled surface. The axle may also include a first plunger and a second plunger configured to apply the compressive force to the braking arrangement. A preload adjustment may urge the first plunger toward the second plunger. The axle may also comprise a pilot configured to may maintain alignment of the axle. A bearing may be disposed radially inward from the housing, and the axle may slideably engage an inner diameter of the bearing.

According to various embodiments, a roller assembly for a cargo loading system is also provided. The roller assembly may include an outer surface, a housing radially inward from the outer surface, a bearing retained within the housing, a braking arrangement retained within the housing, and an axle disposed at least partially within the housing. The axle may be configured to engage the bearing and apply a compressive force to the braking arrangement.

In various embodiments, the axle may be configured to apply the compressive force to the braking arrangement in response to a load on the outer surface. The compressive force may be applied to the braking arrangement proportionally to the load on the outer surface. Proportionally may be used to describe a linear relationship between the compressive force applied to the braking arrangement and the load on the outer surface. The braking arrangement may be configured to produce a braking force proportional to the load on the outer surface. The axle may include a first plunger and a second plunger configured to apply the compressive force to the braking arrangement. The first plunger and second plunger may also be configured to translate towards the braking arrangement in response a load on the outer surface. A preload adjustment may be configured to urge the first plunger toward the second plunger. A pilot may maintain alignment of the axle. A linkage may be coupled to the axle with a roller support structure pivotally coupled to the linkage. The linkage may pivot relative to the axle and the roller support structure in response to the load on the outer surface. The roller assembly may also include an axle interface disposed at a distal end of axle and a roller support structure having an angled surface. The axle interface may engage the angled surface. The axle may also slideably engage an inner diameter of the bearing.

A method of applying reactive braking is also provided. The method includes the steps of applying a load to an outer surface of a roller assembly, axially compressing a braking arrangement disposed at the roller assembly, and increasing resistance to rotation of the outer surface proportional to the load on the outer surface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Rollers of the present disclosure may apply a braking load that is a direct function of the weight applied to the roller (i.e., unit area load applied over the braking roller). This applied load on the braking rollers' outer surface results in the optimum braking load for a given container weight. Using pivot links or a roller-on-ramp on the ends of shafts to compress or decompress a braking arrangement in response to a load on the roller, a variable brake load may be adjusted. The variable brake load may be directly proportional to the containers' applied unit area load on the roller. Controlling the brake load below the load required to maintain traction on the braking roller tends to eliminate the slippage and wear and still provide suitable braking force for heavy loads.

Figure 1:
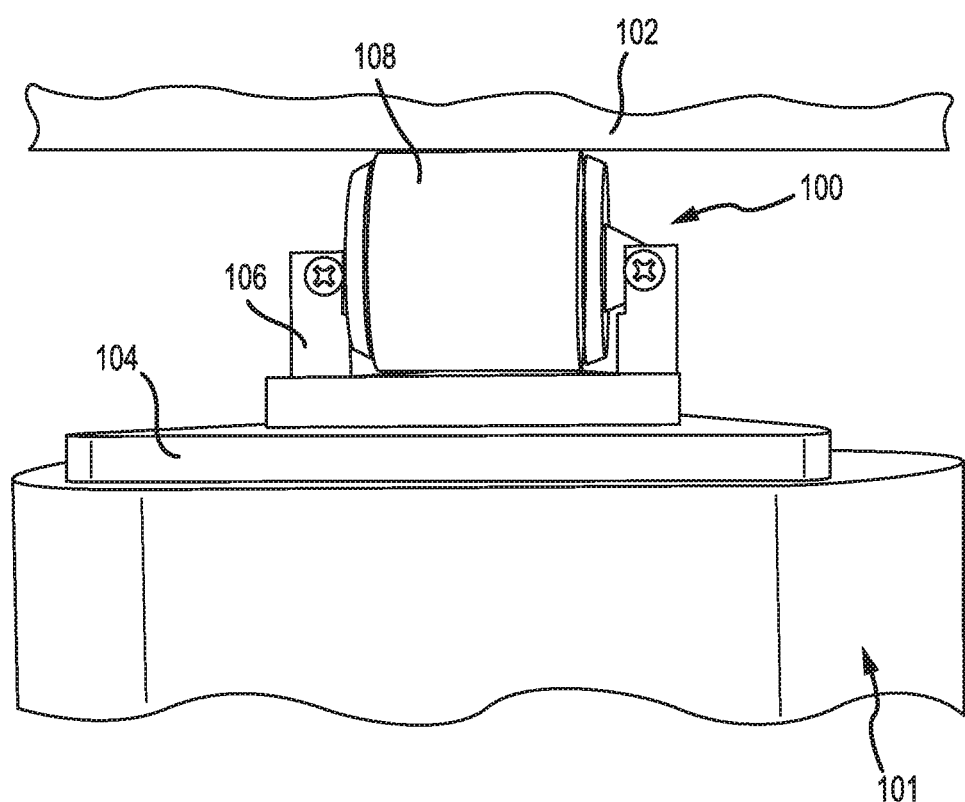
FIG. 1 illustrates an exemplary roller assembly configured for reactive braking in response to a cargo load, in accordance with various embodiments.

Referring now to FIG. 1, an exemplary roller assembly 100 of a cargo loading system 101 is shown, in accordance with various embodiments. Roller assembly 100 may support cargo 102 on platform 104. Roller assembly 100 may be a cylindrical structure and coupled to a roller support structure 106 that is configured to retain roller 108 relative to platform 104. Roller 108 may include an internal braking mechanism configured to increase braking force in response to the mass of cargo 102. The braking force applied by roller assembly 100 may have a linear relationship with the mass of the load supported by roller assembly 100. In various embodiments, roller assembly 100 may also be mounted to a floor to provide a rolling surface for cargo to move across. For example, although roller assembly 100 is illustrated as coupled to platform 104, roller assembly 100 may be mounted to fixed locations in an aircraft cargo bay to enable loading and unloading of cargo with cargo 102 in direct contact with roller 108.

Figure 2:
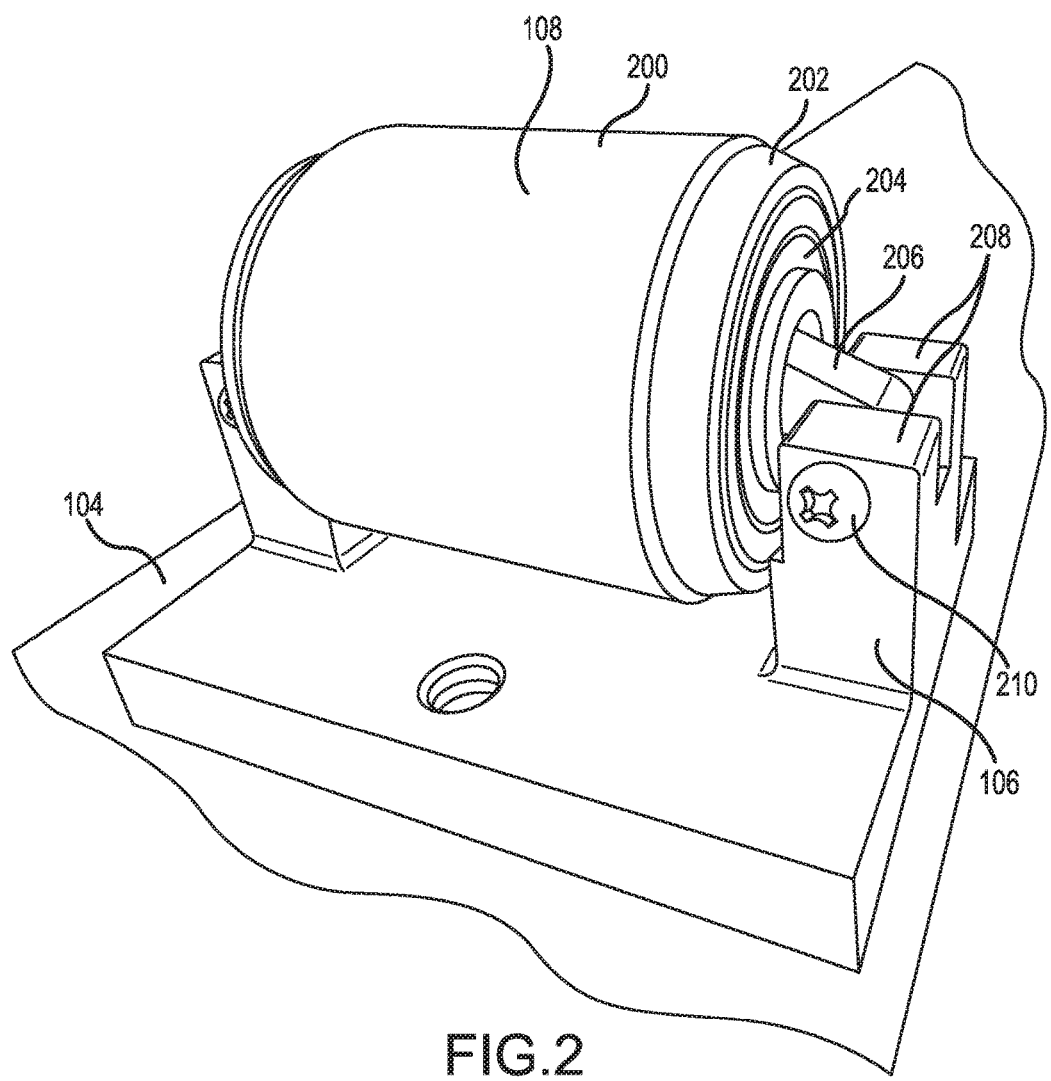
FIG. 2 illustrates an exemplary roller assembly configured for reactive braking in response to a load rolling across an outer surface of a roller, in accordance with various embodiments.

With reference to FIG. 2, roller 108 is shown mounted to roller support structure 106, in accordance with various embodiments. Roller 108 includes an outer surface 200 having friction characteristics suitable for providing traction on cargo containers. Outer surface 200 may thus be made of suitable rubbers (both natural and synthetic) and plastics having the desired friction characteristics. Housing 202 is disposed radially inward to and concentric with outer surface 200 and may be recessed relative to outer surface 200. In that regard, outer surface may protrude from housing 202 to make contact with a cargo container, the ground, or another surface.

Figure 3:
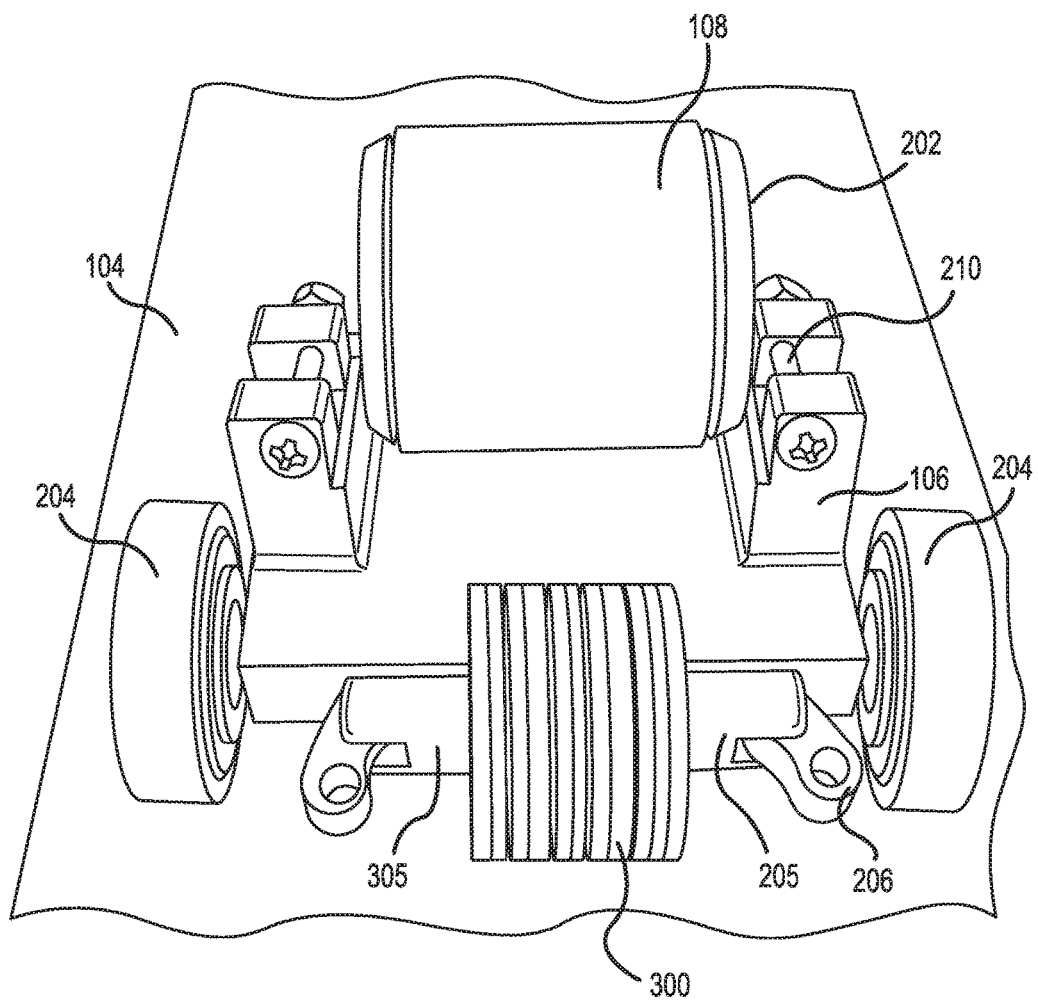
FIG. 3 illustrates an exemplary roller assembly in a partially disassembled state, in accordance with various embodiments.

FIG. 3 illustrates roller 108 in a disassembled state, in accordance with various embodiments. Referring now to FIGS. 2 and 3, housing 202 may contain bearings 204. Bearing 204 may provide support for housing 202 as housing 202 rotates about an axle 205. Axle 205 and axle 305 may be halves of a split axle, as described in greater detail below, with the two halves of the split axle configured to translate relative to one another. Linkage 206 may be coupled to axle 205 and roller support structure 106 by fastener 210 extending through flanges 208 and linkage 206. Linkage 206 is thus pivotally coupled to roller support structure 106. Roller 108 may apply a braking force to cargo container 102 in response to a compressive force transmitted through axle 205 and/or axle 305 into brake arrangement 300. In that regard, the braking force provided by brake arrangement 300 may be related to the angle of linkage 206 relative to roller support structure 106.

Figure 4:
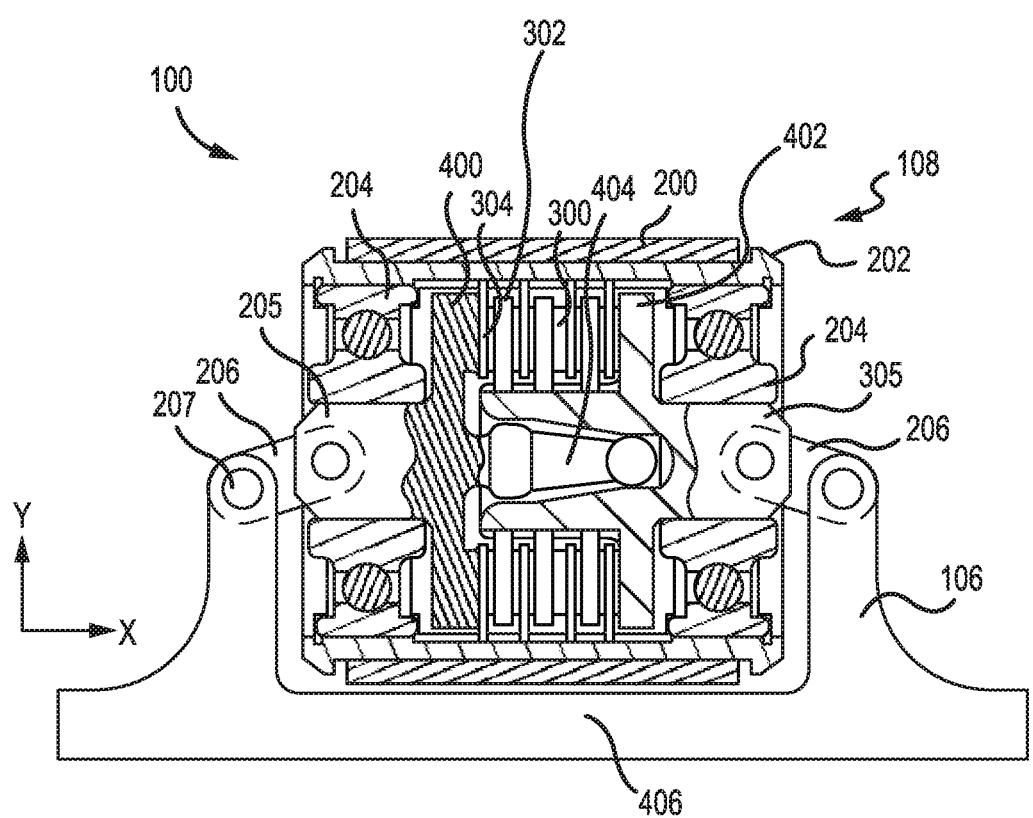
FIG. 4 illustrates a cross-sectional view of a roller assembly configured to apply load reactive braking in response to an angle of a linkage, in accordance with various embodiments.

Referring now to FIG. 4, a cross sectional view of roller assembly 100 is shown, in accordance with various embodiments. Roller 108 is configured to rotate about axle 205, which extends in the x direction and may serve as both an axis of symmetry and an axis of rotation for roller assembly 100. Linkages 206 mechanically couple axle 205 to roller support structure 106 at an angle with the mounting point of linkage 206 to axle 205 offset in the y direction from the mounting point of linkage 206 to roller support structure 106. The angle of linkage 206 may be oriented so that an increased load on outer surface 200 of roller in the y direction urges roller 108 towards base 406 of roller support structure 106. Thus, increased load on outer surface 200 of roller 108 in the y direction may decrease the offset in they direction of mounting point of linkage 206 to axle 205 from the mounting point of linkage 206 to roller support structure 106, thereby generating a compressive force on axle 205 in the x direction.

Axle 205 may act as a spring in the x direction and compress in the x direction in in response to a load applied to outer surface 200 in the y direction. A separate biasing member (not shown) such as a torsion spring can be positioned and configured to urge the axles 205, 305 in the Y direction opposite to that of the load applied to the outer surface 200. Axle 205 may decompress or expand in the x direction back to its original state in response to the load being removed from outer surface 200. Axle 205 may slideably engage an inner diameter of bearing 204 as the axle compresses and decompresses.

As illustrated in FIG. 4, axle 205 may comprise plunger 400 and axle 305 may comprise plunger 402 with the plungers disposed radially inward from outer surface 200. Plunger 400 (and axle 205) may be configured to translate in the x direction relative to plunger 402 (and axle 305). Axle 205 and axle 305 may each be a portion of the complete axle extending through housing 202 and supports bearings 204. Plunger 400 of axle 205 and a plunger 402 of axle 305 may thus be configured to apply compressive force to brake arrangement 300 in response to the compression of axle 305 and axle 205 in the x direction.

In various embodiments, brake arrangement 300 may comprise drive disks 304 and brake disks 302. Drive disks 304 may be coupled to housing 202 and configured to rotate with housing 202. Brake disks 302 may be coupled to axle 305, and thus may be rotationally fixed. Brake disks 302 may include friction media such as, for example, a skewed roller or friction pad configured to create friction with drive disks 304 in response to the compression of axle 305 and 205 in the x direction. A load applied at outer surface 200 in the y direction may cause linkage 206 to rotate about pivot 207, thereby urging axle 305 and axle 205 toward one another and thereby compressing drive disks 304 between brake disks 302. An increased axial (i.e., in the x direction) compressive load between brake disks 302 and drive disks 304 may increase braking force, which is proportional to the load on outer surface 200.

In various embodiments, brake arrangement 300 may be disposed between plunger 400 and plunger 402 and radially inward from outer surface 200. Brake arrangement 300 may resist rotation in response to the compressive force between plunger 400 towards plunger 402 generated in response to a load applied at outer surface 200. In response to a load being removed from outer surface 200, brake arrangement 300 may urge plunger 400 away from plunger 402. Brake arrangement 300 may thus provide the expanding force for the spring-like behavior of axle 305 and 205 by pushing outward in the x direction against plunger 400 and plunger 402 of axle 305 and 205. A pilot 404 extending in the x direction on axle 205 may maintain alignment with axle 305 and react any moment that might be generated by forces applied to outer surface 200 in the y direction. In that regard, pilot 404 may allow for plunger 400 and plunger 402 to move relative to one another axially (i.e., in the x direction) while maintaining alignment radially (i.e., in the y direction).

Figure 5:
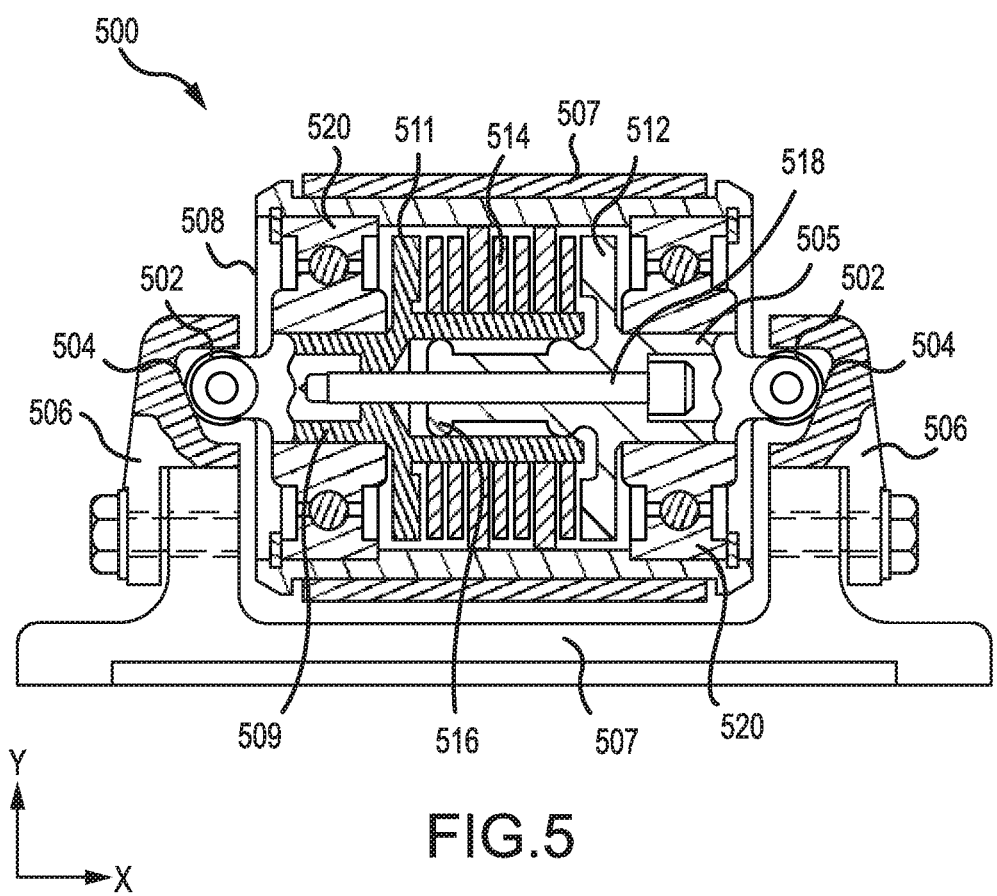
FIG. 5 illustrates a cross-sectional view of a roller assembly configured to apply load reactive braking in response to a position of an axle on an angled support structure, in accordance with various embodiments.

Referring now to FIG. 5, a cross sectional view of roller assembly 500 is shown, in accordance with various embodiments. Roller 508 is configured to rotate about axle 505 and axle 509, which extends in the x direction. Roller 502 may be disposed at the distal ends of axle 505 and 509. Roller 502 may also be configured to engage angled surface 504 of support structure 506. Roller 502 may thus be a sliding interface or a rolling interface to engage angled surface 504 of support structure 506. Angled surface 504 of support structure 506 and 509 may be disposed at an angle relative to the y axis such that a compressive force is exerted on axle 505 and 509 in response to a load applied at outer surface 501 of roller 508. The angle of angled surface 504 relative to the y axis (i.e., the direction of a force applied by a load on outer surface 501 of roller 508) may be selected at least partially based on the desired level of braking in response to the magnitude of the load applied on outer surface 501.

A load on outer surface 501 of roller 508 in the y direction may thus urge roller 508 towards base 507 of roller support structure 506. In response to movement in the y direction of roller 508 towards base 507 of roller support structure 506, the distance spanned by axle 505 and 509 may be reduced based on the position of roller 502 on axle 505 and 509 on angled surface 504. Thus, increased load on outer surface 501 of roller 508 in the y direction may generate a compressive force on axle 505 and axle 509 in the x direction in response to the distance spanned by axle 505 and axle 509 decreasing.

Axle 505 and axle 509 may act as a spring in the x direction and compress in the x direction in response to a load applied to outer surface 501 in the y direction. Axle 505 and 509 may decompress or expand in the x direction back to its original state in response to the load being removed from outer surface 501. Axle 505 and axle 509 may slideably engage an inner diameter of bearing 520 as the axle compresses and decompresses.

Axle 505 may comprise plunger 512 and axle 509 may comprise plunger 511 that translate in the x direction relative to one another. Plunger 511 of axle 509 and a plunger 512 of axle 505 may thus be configured to apply compressive force to brake arrangement 514 in response to the compression of axle 505 and 509. Brake arrangement 514 (similar to brake arrangement 300 in FIG. 4) may resist rotation in response to the compressive force between plunger 511 towards plunger 512 generated in response to a load applied at outer surface 501. In response to a load being removed from outer surface 501, brake arrangement 514 may urge plunger 511 away from plunger 512. Brake arrangement 514 may thus provide the expanding force for the spring-like behavior of axle 505 and axle 509 by pushing outward in the x direction against plunger 511 of axle 509 and plunger 512 of axle 505.

In various embodiments, a pilot 516 may maintain alignment of axle 505 and react any moment that might be generated by forces applied to outer surface 501 in the y direction. In that regard, pilot 516 may allow for plunger 511 and plunger 512 to move relative to one another axially (i.e., in the x direction) while maintaining alignment radially (i.e., in the y direction). Axle 505 and axle 509 may also include a preloading adjustment 518. The preloading adjustment 518 may include, for example, a screw or other adjustable length rod that preloads roller assembly 500 by urging plunger 511 towards plunger 512 and applying a compressive force to brake arrangement 514. Shortening preloading adjustment 518 may increase the braking force applied to roller 508 absent a load on outer surface 501. The preload adjustment may apply a predetermined braking force from brake arrangement 514 until a load sufficient to press axle 505 further along angled surface 504 and overcome the expansive force of brake arrangement 514 at the preloaded level of compression.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A roller assembly, comprising:
   a housing having an outer surface attached thereto;
   an axle extending through the housing having a first portion and a second portion translatable relative to one another in an axial direction; and
   a braking arrangement positioned at least partially within the housing and configured to increase resistance to rotation of the housing proportionally to a load applied against the outer surface, wherein the first portion of the axle and the second portion of the axle are configured to apply a compressive force to the braking arrangement proportional to the load applied against the outer surface.

2. The roller assembly of claim 1, further comprising:
   the axle coupled to the braking arrangement;
   a linkage coupled to the axle; and
   a roller support structure pivotally coupled to the linkage, wherein the linkage is configured to pivot relative to the axle and the roller support structure in response to the load on the outer surface.

3. The roller assembly of claim 2, further comprising an axle interface disposed at a distal end of the axle, wherein the roller support structure has an angled surface and the axle interface is configured to engage the angled surface.

4. The roller assembly of claim 2, wherein the axle comprises a first plunger and a second plunger configured to apply a compressive force to the braking arrangement.

5. The roller assembly of claim 4, further comprising a preload adjustment configured to urge the first plunger toward the second plunger.

6. The roller assembly of claim 5, wherein the axle further comprises:
   the first portion of the axle having the first plunger and having a pilot extending from the first portion in a first direction; and
   the second portion of the axle having the second plunger and configured to receive the pilot, wherein the first portion is configured to translate relative to the second portion in the first direction.

7. The roller assembly of claim 2, further comprising a bearing disposed radially inward from the housing.

8. The roller assembly of claim 7, wherein the axle is configured to slideably engage an inner diameter of the bearing.

9. A roller assembly for a cargo loading system, comprising:
   an outer surface;
   a housing radially inward from the outer surface;
   a bearing retained within the housing;
   a braking arrangement retained within the housing; and
   an axle disposed at least partially within the housing and configured to engage the bearing, the axle configured to apply a compressive force to the braking arrangement, wherein a first portion of the axle and a second portion of the axle are configured to apply a compressive force to the braking arrangement proportional to a load applied against the outer surface.

10. The roller assembly for the cargo loading system of claim 9, wherein the axle is configured to apply the compressive force to the braking arrangement in response to a load on the outer surface.

11. The roller assembly for the cargo loading system of claim 10, wherein the compressive force applied to the braking arrangement is proportional to the load on the outer surface.

12. The roller assembly for the cargo loading system of claim 10, wherein the braking arrangement is configured to produce a braking force proportional to the load on the outer surface.

13. The roller assembly for the cargo loading system of claim 9, wherein the axle comprises a first plunger and a second plunger configured to apply the compressive force to the braking arrangement.

14. The roller assembly for the cargo loading system of claim 13, wherein the first plunger and the second plunger are configured to translate towards the braking arrangement in response a load on the outer surface.

15. The roller assembly for the cargo loading system of claim 14, further comprising a preload adjustment configured to urge the first plunger toward the second plunger.

16. The roller assembly for the cargo loading system of claim 13, further comprising a pilot configured to maintain alignment of the axle.

17. The roller assembly for the cargo loading system of claim 9, further comprising:
   a linkage coupled to the axle; and
   a roller support structure pivotally coupled to the linkage, wherein the linkage is configured to pivot relative to the axle and the roller support structure in response to a load on the outer surface.

18. The roller assembly for the cargo loading system of claim 9, further comprising:
   an axle interface disposed at a distal end of axle; and
   a roller support structure having an angled surface, wherein the axle interface is configured to engage the angled surface.

19. The roller assembly for the cargo loading system of claim 9, wherein the axle is configured to slideably engage an inner diameter of the bearing.

20. A method of applying reactive braking, comprising:
   applying a load to an outer surface of a roller assembly;
   axially compressing a braking arrangement disposed at the roller assembly between a first portion of an axle and a second portion of an axle in response to the load on the outer surface; and
   increasing resistance to rotation of the outer surface proportional to the load on the outer surface.

* * * * *